(12) United States Patent
Farre Guiu et al.

(10) Patent No.: US 10,834,413 B2
(45) Date of Patent: Nov. 10, 2020

(54) FAST AND ACCURATE BLOCK MATCHING FOR COMPUTER GENERATED CONTENT

(71) Applicant: DISNEY ENTERPRISES, INC., Burbank, CA (US)

(72) Inventors: Miquel Angel Farre Guiu, Bern (CH); Marc Junyent Martin, Cornella de Llobregat (ES)

(73) Assignee: Disney Enterprises, Inc., Burbank, CA (US)

(*) Notice: Subject to any disclaimer, the term of this patent is extended or adjusted under 35 U.S.C. 154(b) by 109 days.

(21) Appl. No.: 16/112,565

(22) Filed: Aug. 24, 2018

(65) Prior Publication Data

US 2020/0068208 A1 Feb. 27, 2020

(51) Int. Cl.
*H04N 19/27* (2014.01)
*G06T 17/10* (2006.01)
*H04N 19/60* (2014.01)
*H04N 19/52* (2014.01)

(52) U.S. Cl.
CPC .......... *H04N 19/27* (2014.11); *G06T 17/10* (2013.01); *H04N 19/52* (2014.11); *H04N 19/649* (2014.11)

(58) Field of Classification Search
None
See application file for complete search history.

(56) References Cited

U.S. PATENT DOCUMENTS 5,014,334 A * 5/1991 Fukuhara .............. G06K 9/48
382/233
6,208,347 B1 * 3/2001 Migdal ................. G06T 17/20
345/419
6,677,944 B1 * 1/2004 Yamamoto ............ G06T 17/00
345/422
6,744,442 B1 * 6/2004 Chan ................... G06T 15/04
345/582
6,847,359 B1 * 1/2005 Ono ..................... G06T 17/10
345/419

(Continued)

OTHER PUBLICATIONS

D. Thanou, P. A. Chou and P. Frossard, "Graph-Based Compression of Dynamic 3D Point Cloud Sequences," in IEEE Transactions on Image Processing, vol. 25, No. 4, pp. 1765-1778 (Year: 2016).*

(Continued)

*Primary Examiner* — Jayanti K Patel
*Assistant Examiner* — Stefan Gadomski
(74) *Attorney, Agent, or Firm* — Artegis Law Group, LLP

(57) ABSTRACT

A set of software applications configured to perform interframe and/or intraframe encoding operations based on data communicated between a graphics application and a graphics processor. The graphics application transmits a 3D model to the graphics processor to be rendered into a 2D frame of video data. The graphics application also transmits graphics commands to the graphics processor indicating specific transformations to be applied to the 3D model as well as textures that should be mapped onto portions of the 3D model. Based on these transformations, an interframe module can determine blocks of pixels that repeat across sequential frames. Based on the mapped textures, an intraframe module can determine blocks of pixels that repeat within an individual frame. A codec encodes the frames of video data into compressed form based on blocks of pixels that repeat across frames or within frames.

15 Claims, 11 Drawing Sheets

(56) References Cited

U.S. PATENT DOCUMENTS

| | | | | |
|---|---|---|---|---|
| 7,027,642 | B2* | 4/2006 | Rubbert | A61C 7/00 382/154 |
| 7,038,676 | B2* | 5/2006 | Iwata | H04N 19/51 345/418 |
| 7,103,211 | B1* | 9/2006 | Medioni | G06T 17/10 382/118 |
| 7,990,389 | B2* | 8/2011 | Barone | H04N 19/537 345/475 |
| 8,666,119 | B1* | 3/2014 | Mallet | G06T 19/00 382/107 |
| 9,946,732 | B2* | 4/2018 | Maranzana | G06F 30/00 |
| 10,242,492 | B2* | 3/2019 | Ha | G06T 15/60 |
| 2002/0047841 | A1* | 4/2002 | Moriwaki | G06T 17/10 345/419 |
| 2002/0063708 | A1* | 5/2002 | Senda | G06T 15/00 345/423 |
| 2002/0140703 | A1* | 10/2002 | Baker | G06T 15/04 345/582 |
| 2003/0020718 | A1* | 1/2003 | Marshall | G06T 13/40 345/474 |
| 2003/0184603 | A1* | 10/2003 | Marshall | G06T 13/20 345/473 |
| 2003/0218607 | A1* | 11/2003 | Baumberg | G06T 15/20 345/419 |
| 2004/0164956 | A1* | 8/2004 | Yamaguchi | G06F 3/04845 345/156 |
| 2004/0164957 | A1* | 8/2004 | Yamaguchi | G06T 19/20 345/156 |
| 2005/0117019 | A1* | 6/2005 | Lamboray | G06T 9/00 348/159 |
| 2007/0097121 | A1* | 5/2007 | Loop | G06T 15/00 345/428 |
| 2008/0219501 | A1* | 9/2008 | Matsumoto | G06T 7/251 382/103 |
| 2008/0226128 | A1* | 9/2008 | Birtwistle | H04N 13/261 382/103 |
| 2008/0291199 | A1* | 11/2008 | Ravnikar | G06F 30/00 345/419 |
| 2009/0080516 | A1* | 3/2009 | Chang | G06T 9/001 375/240.03 |
| 2009/0129665 | A1* | 5/2009 | Ishiyama | G01B 11/24 382/154 |
| 2009/0278844 | A1* | 11/2009 | Chang | G06T 9/001 345/419 |
| 2010/0091028 | A1* | 4/2010 | Grossman | G06T 15/04 345/587 |
| 2011/0295564 | A1* | 12/2011 | Chazal | G06T 17/10 703/1 |
| 2012/0306876 | A1* | 12/2012 | Shotton | G06T 7/251 345/424 |
| 2013/0063418 | A1* | 3/2013 | Kaschalk | G06T 13/20 345/419 |
| 2013/0120357 | A1* | 5/2013 | Joshi | G06T 19/20 345/419 |
| 2013/0336583 | A1* | 12/2013 | Ernst | G06T 7/251 382/165 |
| 2014/0092439 | A1* | 4/2014 | Krig | G06T 9/001 358/2.1 |
| 2014/0098094 | A1* | 4/2014 | Neumann | G06T 17/10 345/420 |
| 2014/0160127 | A1* | 6/2014 | Sundaram | G06T 17/10 345/424 |
| 2014/0192050 | A1* | 7/2014 | Qiu | G06T 17/10 345/420 |
| 2014/0253548 | A1* | 9/2014 | Schmidt | G06T 17/10 345/420 |
| 2015/0208070 | A1* | 7/2015 | Verzijp | H04N 19/46 375/240.02 |
| 2015/0339850 | A1* | 11/2015 | Utsugi | G06T 13/40 345/420 |
| 2015/0371441 | A1* | 12/2015 | Shim | G06T 17/005 345/420 |
| 2015/0379759 | A1* | 12/2015 | Kotlyarov | G06F 17/30 345/421 |
| 2016/0110909 | A1* | 4/2016 | Kim | G06K 9/00288 345/419 |
| 2016/0148411 | A1* | 5/2016 | Chen | G06T 17/10 345/420 |
| 2016/0314341 | A1* | 10/2016 | Maranzana | G06F 16/5838 |
| 2017/0032567 | A1* | 2/2017 | Park | G06T 15/80 |
| 2017/0132846 | A1* | 5/2017 | Iverson | G06T 15/40 |
| 2017/0178397 | A1* | 6/2017 | Hillesland | G06T 15/06 |
| 2017/0337741 | A1* | 11/2017 | Fradet | G06T 17/10 |
| 2018/0007365 | A1* | 1/2018 | Lawrence | H04N 19/139 |
| 2018/0025543 | A1* | 1/2018 | Troy | G06T 17/00 345/419 |
| 2018/0041768 | A1* | 2/2018 | Koo | H04N 19/96 |
| 2018/0053345 | A1* | 2/2018 | Zou | G06T 15/005 |
| 2018/0253867 | A1* | 9/2018 | Laroche | G06T 9/001 |
| 2018/0288363 | A1* | 10/2018 | Amengual Galdon | H04N 19/40 |
| 2018/0330149 | A1* | 11/2018 | Uhlenbrock | G06T 7/11 |
| 2019/0043203 | A1* | 2/2019 | Fleishman | G06K 9/00711 |
| 2019/0066352 | A1* | 2/2019 | Kazakov | G06T 15/005 |
| 2019/0287297 | A1* | 9/2019 | Abhiram | G06T 17/05 |
| 2019/0392100 | A1* | 12/2019 | Cha | G06T 17/205 |
| 2020/0005475 | A1* | 1/2020 | Watanabe | G06F 30/23 |

OTHER PUBLICATIONS

Deering, Michael. "Geometry compression." Proceedings of the 22nd annual conference on Computer graphics and interactive techniques. pp. 13-20 (Year: 1995).*

S. Han, T. Yamasaki and K. Aizawa, "3D Video Compression Based on Extended Block Matching Algorithm," 2006 International Conference on Image Processing, Atlanta, GA, 2006, pp. 525-528.*

* cited by examiner

FAST AND ACCURATE BLOCK MATCHING FOR COMPUTER GENERATED CONTENT

BACKGROUND

Field of the Various Embodiments

Embodiments of the present invention relate generally to video processing and, more specifically, to fast and accurate block matching for computer-generated content.

DESCRIPTION OF THE RELATED ART

The term "video codec" typically refers to a software application capable of encoding frames of video data into a compressed form. A conventional video codec may implement interframe encoding and/or intraframe encoding to encode frames of video data.

When implementing interframe encoding, the video codec analyzes sequential frames of the video data to identify blocks of pixels that reside in a first frame and repeat in a subsequent frame. Once a given block of repeating pixels has been identified, the video codec generates a vector indicating where in the subsequent frame the block of pixels repeats. The video codec generates a compressed representation of the first frame and the subsequent frame based on each block of repeated pixels and the vectors corresponding to each block of repeated pixels. This approach reduces the size of two or more frames because each repeated block of pixels is stored only once for both frames, as opposed to multiple times.

The video codec can implement a variety of different interframe block matching algorithms to identify blocks of pixels that repeat across frames. In practice, any given interframe block matching algorithm uses only a limited number of available block dimensions and a limited number of available vector directions to identify blocks of repeating pixels. To identify a block of pixels that repeats across frames, the block matching algorithm selects a block of pixels having specific dimensions within one frame and then iteratively compares that block of pixels to other blocks of pixels within the subsequent frame that have the same dimensions and reside along one of the available vector directions. A match is detected when two blocks of pixels share similar pixel values. The number of comparisons needed to identify a block of pixels that repeats across frames depends on the number of available dimensions and the number of available vector directions, among other factors such as computational efficiency.

When implementing intraframe encoding, the video codec compares separate blocks of pixels within an individual frame of the video data to identify blocks of pixels that repeat within that frame. For a given block of repeated pixels, the video codec generates one or more vectors indicating where the given block repeats within the frame. The video codec generates a compressed representation of the frame based on each block of repeated pixels and the vectors corresponding to each block of repeated pixels. This approach reduces the size of the frame because each repeated block of pixels is stored only once for that frame, as opposed to multiple times.

The video codec can implement a variety of different intraframe block matching algorithms to identify blocks of pixels that repeat within a given frame. As with interframe block matching algorithms, any given intraframe block matching algorithm uses only a limited number of available block dimensions and a limited number of available vector directions to identify blocks of repeating pixels. To identify a block of pixels that repeats within a frame, the block matching algorithm selects a block of pixels having specific dimensions within the frame and then iteratively compares that block of pixels to other blocks of pixels within the frame that have the same dimensions and reside along one of the available vector directions. A match is detected when two blocks of pixels share similar pixel values. Similar to interframe block matching algorithms, the number of comparisons needed to identify a block of pixels that repeats within a frame depends on the number of available dimensions and the number of available vector directions, among other factors.

One drawback of conventional interframe and intraframe encoding techniques is that such techniques typically require significant processing resources. In particular, with either approach, a vast number of blocks of pixels must be compared to one another to identify blocks of repeated pixels. Further, as mentioned above, the number of comparisons needed is a function of the number of available block dimensions and the number of available vector directions. In this vein, many modern video codecs implement expanded sets of available block dimensions and vector directions. These increased numbers of available block dimensions and available vector directions vastly increases the number of block comparisons needed during the encoding process, thereby requiring even more processing resources and extending the amount of time required to encode video data.

The above issues are especially problematic in the context of real-time and/or live video streaming, where compressed video needs to be encoded quickly for subsequent transmission across a network. One approach to expediting video encoding operations is to provide specialized compression circuitry within or coupled to the graphics hardware that is dedicated to performing video compression operations. However, this approach increases the cost of the graphics hardware and does not address older, already-deployed graphics hardware that lacks specialized compression circuitry.

As the foregoing illustrates, what is needed in the art are more effective techniques for compressing video data.

SUMMARY

Various embodiments include a computer-implemented method for encoding video data, including obtaining a first command that has been transmitted to a processor, identifying a first pixel that resides in a first video frame, identifying a second pixel that resides in either the first video frame or a second video frame based on the first graphics command and the first pixel, generating a first vector based on a first location associated with the first pixel and a second location associated with the second pixel, and generating encoded video data based on the first pixel, the second pixel, and the first vector.

At least one advantage of the disclosed techniques is that frames of video data can quickly be encoded into a compressed form without performing a vast number of comparison operations. Accordingly, compressed video data can be generated much faster than with conventional techniques.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
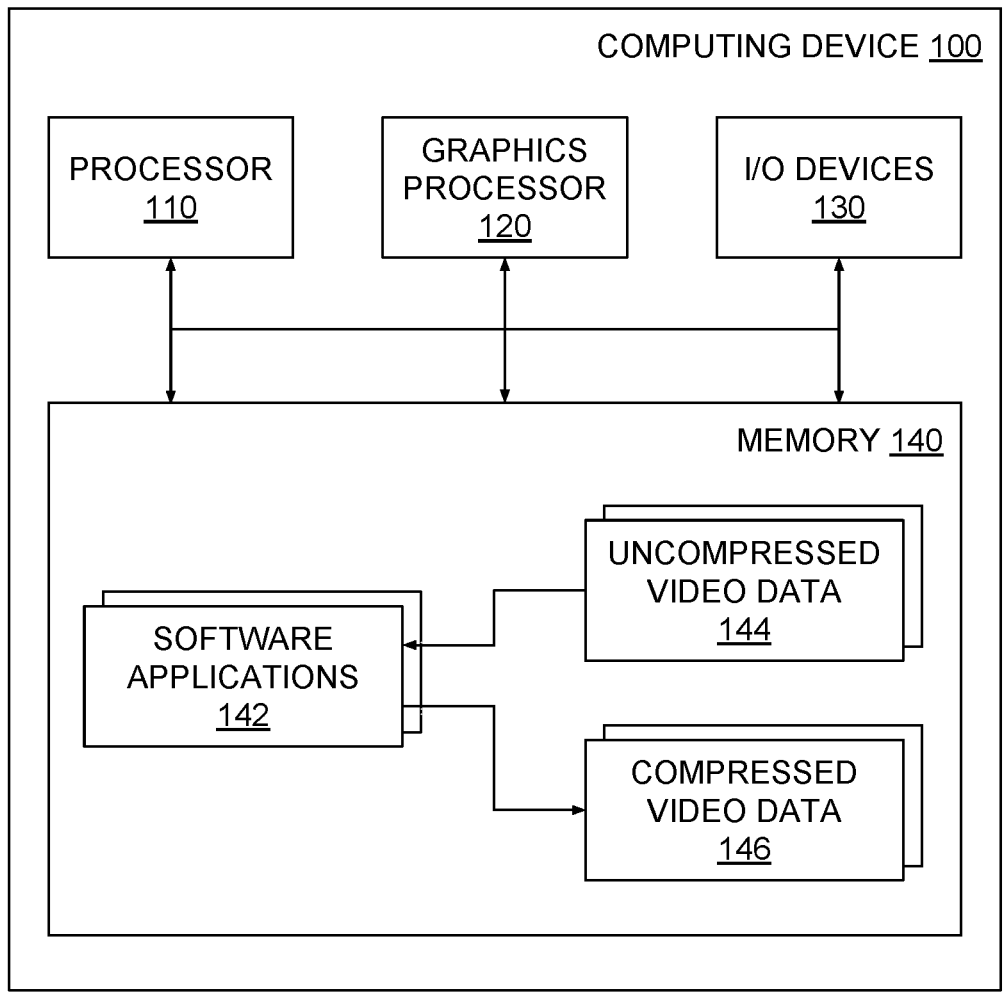
FIG. 1 illustrates a computing device configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

As noted above, conventional video codecs often perform interframe and/or intraframe encoding to encode frames of video data into a compressed form. With interframe encoding, the video codec identifies blocks of pixels that repeat across sequential frames of the video data and then generates vectors describing where those blocks of pixels repeat across the sequential frames. With intraframe encoding, the video codec identifies blocks of pixels that repeat within an individual frame of the video data and then generates vectors describing where those blocks repeat within the frame.

In either approach, the video codec implements a block matching process that involves numerous comparisons between potentially similar blocks of pixels. These numerous comparisons consume excessive processing resources and can cause the video encoding process to take a very long time. Consequently, conventional video codecs are not well-suited for encoding real-time streaming video that needs to be compressed and then streamed quickly. Although video encoding can be accelerated using specialized compression circuitry, this compression circuitry increases the cost of new graphics hardware and cannot improve older graphics hardware.

To address these issues, various embodiments include a set of software applications configured to perform interframe and/or intraframe encoding operations based on data communicated between a graphics application and a graphics processor. The graphics application transmits a 3D model to the graphics processor to be rendered into a 2D frame of video data. The graphics application also transmits graphics commands to the graphics processor indicating specific transformations to be applied to the 3D model as well as textures that should be mapped onto portions of the 3D model.

To perform interframe encoding, an interframe module analyzes the transformations to be applied to the 3D model between frames and then identifies blocks of pixels that repeat across sequential frames. A block of pixels is described herein as "repeating" across any two frames when similar versions of the block of pixels appear in both of those frames. For a given block of pixels, the interframe module determines a vector indicating a location where the given block of pixels repeats across the sequential frames. The interframe module then encodes frames of the video data into a compressed form based on the identified blocks of pixels and associated vectors.

To perform intraframe encoding, an intraframe module generates an intermediate render of the 3D model that includes texture coordinates derived from textures mapped onto the 3D model. The intraframe module identifies blocks of pixels that repeat within an individual frame by identifying repeated texture coordinates within the intermediate render. A block of pixels is described herein as "repeating" within an individual frame when similar versions of the block of pixels appear at multiple locations within the frame. For a given block of pixels, the intraframe module determines a vector indicating locations where the block of pixels repeats within the frame. The intraframe module then encodes frames of the video data into a compressed form based on the identified blocks of pixels and associated vectors.

Either interframe encoding, intraframe encoding, or both types of encoding can be enabled in order to optimize encoding efficiency. A third-party software application or a plugin within the graphics application may select interframe and/or intraframe encoding depending on the video data being encoded and/or the measured efficiency of each encoding technique.

One advantage of the disclosed techniques is that frames of video data can quickly be encoded into a compressed form without performing a vast number of comparison operations. Accordingly, compressed video data can be generated much faster than with conventional techniques. In addition, the disclosed techniques do not rely on any dedicated compression circuitry, and therefore can be used in conjunction with pre-existing graphics hardware.

Importantly, because the disclosed techniques leverage information captured from a graphics processor when generating the video data, these techniques are especially well-suited to graphics applications such as video games. For example, the disclosed techniques could improve the speed and efficiency with which a video game is live-streamed across a network. Accordingly, the disclosed techniques represent multiple technological advancements over prior art approaches.

System Overview

FIG. 1 illustrates a computing device configured to implement one or more aspects of the present invention. As shown, a computing device 100 includes a processor 110, the graphics processor 120, input/output (I/O) devices 130, and memory 140, coupled together.

Processor 110 includes any technically feasible set of hardware units configured to process data and execute software applications. For example, processor 110 could include one or more central processing units (CPUs). Graphics processor 120 includes any technically feasible set of hardware units configured to process graphics-oriented data and execute graphics-oriented applications. For example, graphics processor 120 could include one or more graphics processing units (GPUs). I/O devices 130 include any technically feasible set of devices configured to perform input and/or output operations, including, for example, a display device, a keyboard, and a touchscreen, among others.

Memory 140 includes any technically feasible storage media configured to store data and software applications, such as, for example, a hard disk, a random-access memory (RAM) module, and a read-only memory (ROM). Memory 140 includes software applications 142, uncompressed video data 144, and compressed video data 146. As described in greater detail below in conjunction with FIG. 2, software applications 142 are configured to encode uncompressed video data 144 to generate compressed video data 146.

Figure 2:
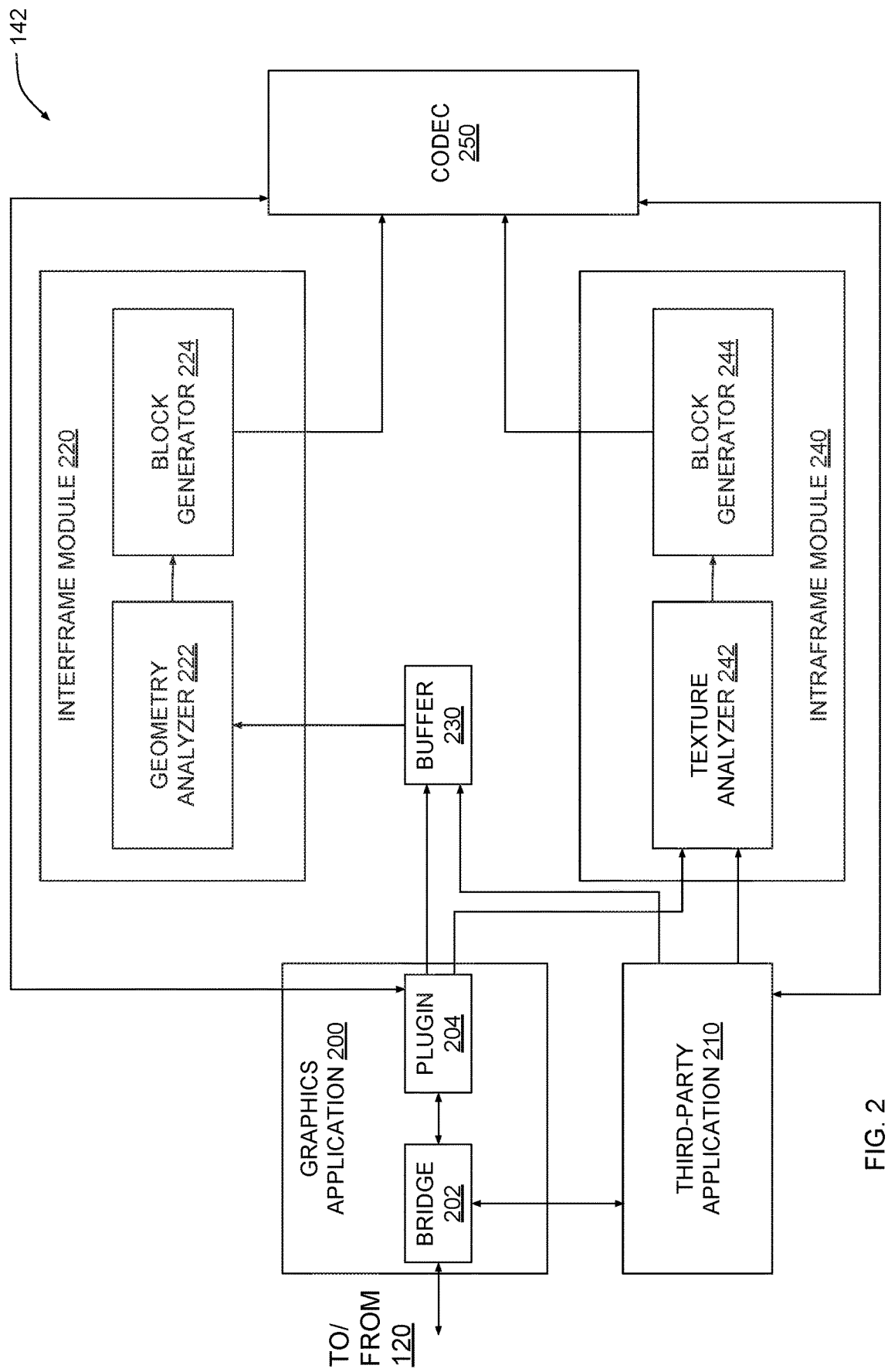
FIG. 2 is a more detailed illustration of the software applications of FIG. 1, according to various embodiments of the present invention.

FIG. 2 is a more detailed illustration of the software applications of FIG. 1, according to various embodiments of the present invention. As shown, software applications 142 include a graphics application 200, a third-party application 210, an interframe module 220, a buffer 230, an intraframe module 240, and a codec 250. In one embodiment, some or all of the different software applications shown are included as modules within one overarching software application.

Graphics application 200 is configured to execute on processor 110 and to offload graphics processing tasks to graphics processor 120. Graphics application 200 includes a bridge 202 across which graphics application 200 communicates with graphics processor 120. In one embodiment, graphics application 200 may also include a plugin 204 that facilitates communication with interframe module 220 and intraframe module 240.

Graphics application 120 transmits 3D models, 2D textures, and graphics commands to graphics processor 120 via bridge 202. A given 3D model could include, for example, a set of vertices that define a triangulated mesh of polygons. A given 3D texture could include, for example, a 2D grid indicating color values associated with each location of the 2D grid. A given graphics command could include, for example, a transformation operation to be applied to a 3D model or a texture mapping operation for mapping a texture to the surface of a 3D model. Graphics application transmits 3D models to graphics processor 120 to cause graphics processor 120 to render 2D frames ("frames") based on those 3D models. Uncompressed video data 144 includes some or all of those frames.

Third-party application 210 is a software application that interfaces with bridge 202 to copy any data that graphics application 200 transmits to or receives from graphics processor 120. The copied data may include 3D models, 2D textures, graphics commands, and frames rendered by graphics processor 120. Third-party application 210 provides this data to interframe module 220 and/or intraframe module 240. In some configurations, third-party application 210 stores multiple frames in buffer 230 to allow interframe module 220 to perform an interframe block matching process with those frames, as described in greater detail below. In other configurations, third-party application 210 transmits an individual frame to intraframe module 240 so that intraframe module 240 can perform an intraframe block matching process with that frame, as also described in greater detail below. In one embodiment, plugin 204 may perform the functionality of third-party application 210 described above.

Interframe module 220 is a software module that is configured to perform the interframe block matching process mentioned above based on a first frame and a second frame stored in buffer 230. The first frame and the second frame occur sequentially within uncompressed video data 144. Interframe module 220 analyzes a 3D model and one or more graphics commands obtained from graphics application 200 (via third-party application 210 or plugin 204) to identify blocks of pixels that repeat across the first and second frames. Interframe module 220 performs various steps of the interframe block matching process via a geometry analyzer 222 and a block generator 224. Geometry analyzer 222 and block generator 224 are described in greater detail below, Geometry analyzer 222 parses the one or more graphics commands to extract a set of transformations applied to the 3D model between the first frame and the second frame. For example, geometry analyzer 222 could extract a transformation matrix from a given graphics command describing how vertex positions of the 3D model should be modified between the first frame and the second frame. These transformations can cause predictable changes to pixels between the first and second frames.

For example, suppose the 3D model includes a polygon based on which a first pixel is rendered in the first frame. Suppose also that a transformation is applied to the 3D model which causes the polygon to change position between the first frame and the second frame. The second frame could include a second pixel that is also rendered based on the polygon and therefore appears similar to the first pixel. However, because the polygon changes position between the first and second frames, the second pixel would have a different location relative to the first pixel. In this exemplary situation, geometry analyzer 222 could determine the location of the first pixel based on the transformation. Geometry analyzer could also determine the location of the second pixel based on the location of the first pixel and the transformation. This particular example is described in greater detail below in conjunction with FIGS. 4-6.

Geometry analyzer 222 analyzes some or all transformations applied to the 3D model between the first frame and the second frame and then generates, for any given pixel included in the first frame, a vector indicating where the given pixel repeats in the second frame. Returning to the above example, geometry analyzer 222 could generate a vector originating at the location of the first pixel and terminating at the location of the second pixel. Geometry analyzer 222 transmits information specifying repeated pixels and corresponding vectors to block generator 224.

Block generator 224 analyzes the received data and then groups pixels having similar vectors together into blocks. A given block of pixels includes pixels which maintain the same spatial relationships relative to one another across the first and second frames. Block generator 224 can generate blocks having arbitrary size and dimension. Block generator 224 also generates a vector for any given block describing translational movement of the block of pixels, if any, between the two frames. Block generator 224 transmits blocks of pixels and corresponding vectors to codec 250.

Codec 250 is configured to encode the first and second frames based on the identified blocks and corresponding vectors. In so doing, codec 250 generates a compressed version of the two frames that is smaller in size than an uncompressed version of the two frames. Codec 250 monitors the efficiency with which compression occurs and reports efficiency data back to third-party application 210 or plugin 204. Third-party application 210 or plugin 204 then determines whether interframe encoding should continue to be enabled and whether intraframe encoding should additionally be enabled. Codec 250 may implement any existing compression standard and/or format. However, codec 250 need not perform conventional block matching techniques that involve numerous comparisons between blocks of pixels. In particular, because interframe module 220 can anticipate how and where pixels repeat across sequential frames, some or all of these comparisons are unnecessary.

One advantage of applying interframe module 220 to identify repeated blocks of pixels is that uncompressed video data 144 can be rapidly compressed without needing specialized compression circuitry. Accordingly, the disclosed techniques can be applied to compress video data for live streaming across a network.

Intraframe module 240 provides another compression pathway in addition to that provided by interframe module 220. Intraframe module 240 is a software module that is configured to perform the intraframe block matching process mentioned above based on an individual frame. Intraframe module 240 analyzes a 3D model, one or more graphics commands obtained from graphics application 200, and one or more textures mapped onto the 3D model. Based on this data, intraframe module 240 identifies blocks of pixels that repeat within the individual frame. Intraframe module 240 performs various steps of the intraframe block matching process via a texture analyzer 242 and a block generator 244.

Texture analyzer 242 parses the one or more graphics commands to determine specific positions on the 3D model where the one or more textures are mapped. Texture analyzer 242 then generates an intermediate render of the 3D model by rendering texture coordinates (instead of color values) to pixels. Based on these texture coordinates, texture analyzer 242 determines pixels derived from the mapped textures which repeat at other locations within the individual frame. These other locations typically reside in other regions of the frame where the same texture is mapped to the 3D model. Because texture analyzer 242 performs these operations based on texture coordinates instead of pixel color values, texture analyzer 242 conserves processor cycles and can therefore identify repeated pixels faster than with conventional intraframe encoding techniques.

For a given repeated pixel, texture analyzer 242 generates a vector indicating other locations within the individual frame where the pixel repeats. Texture analyzer 242 transmits information specifying the repeated pixels and associated vectors to block generator 224. An example of how intraframe module 240 performs the intraframe block matching process is described in greater detail below in conjunction with FIGS. 8-10.

As mentioned, interframe module 220 and intraframe module 240 provide two compression pathways for generating compressed video data 146. When either encoding technique is implemented, compressed video data 146 indicates any residual color differences between repeated blocks of pixels. Those differences can be attributed to differing lighting conditions across frames or within a frame.

Third-party application 210 or plugin 202, in some embodiments, can select either or both of interframe module 220 and intraframe module 240 module to use for encoding purposes based on various factors. Those factors include a degree of repetitiveness of media content within uncompressed video data 144 and/or a measured encoding efficiency of interframe module 220 and intraframe module 240. An approach for selecting encoding modalities is described in greater detail below in conjunction with FIG. 3.

Figure 3:
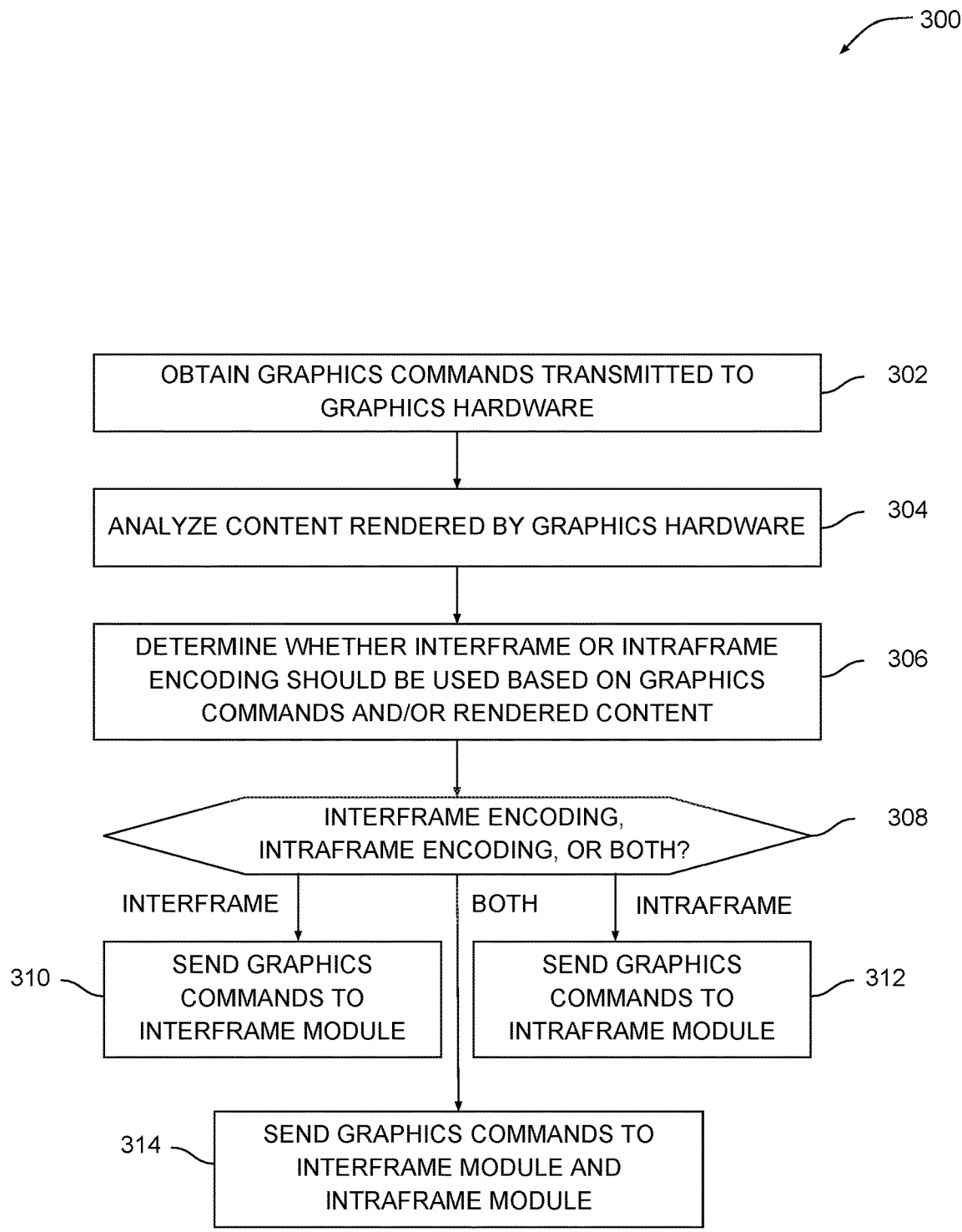
FIG. 3 is a flow diagram of method steps for selecting between different encoding techniques, according to various embodiments of the present invention.

FIG. 3 is a flow diagram of method steps for selecting between different encoding techniques, according to various embodiments of the present invention. Although the method steps are described in conjunction with the systems of FIGS. 1-2, persons skilled in the art will understand that any system configured to perform the method steps in any order falls within the scope of the present invention.

As shown, a method 300 begins at step 302, where third-party application 210 obtains one or more graphics commands transmitted from graphic application 200 to graphics processor 120. A given graphics command could include, for example, a transformation operation that is to be applied to a 3D model between sequentially rendered frames. A given graphics command could also include, in another example, a texture mapping operation for mapping a texture to a portion of the 3D model.

At step 304, third-party application 210 analyzes one or more frames of content rendered by graphics processor 120. Interframe encoding may be efficient in situations where rendered pixels do not move significantly between frames. Intraframe encoding may be efficient in situations where individual frames include numerous repeated textures. Third-party application 210 analyzes the one or more frames of content to determine the degree to which pixels move between frames and/or the extent to which a given frame includes many repeated textures.

At step 306, third-party application 210 determines whether interframe encoding, intraframe encoding, or both interframe and intraframe encoding should be used based on the one or more graphics commands and/or the rendered content. For example, third-party application 210 could determine that because a given frame includes many repeated textures, intraframe encoding should be used. Third-party application 210 can also make this determination based on the one or more graphics commands. A given graphics commands could specify, for example, that many transformations should be applied to a 3D model between successive frames, which indicates that interframe encoding could be used to anticipate pixel movements based on those transformations. Alternatively, a given graphics command could specify, for example, numerous textures to map to the 3D model, indicating that intraframe encoding could be used to locate repeated pixels based on those textures. In some cases, both encoding techniques can be applied in conjunction with one another if doing so would improve encoding efficiency.

At step 308, if interframe encoding is to be used, then the method 300 proceeds to step 310 where third-party application 210 transmits the one or more graphics commands and two or more sequential frames to interframe module 220. Interframe module 220 then performs an interframe encoding process described above in conjunction with FIG. 2 and also described by way of example below in conjunction with FIGS. 4-6.

At step 308, if intraframe encoding is to be used, then the method 300 proceeds to step 312 where third-party application 210 transmits the one or more graphics commands and an individual frame to interframe module 240. Intraframe module 240 then performs an intraframe encoding process described above in conjunction with FIG. 2 and also described by way of example below in conjunction with FIGS. 8-10.

At step 308, if both interframe and intraframe encoding are to be used, then the method 300 proceeds to step 314, where third-party application 210 transmits the one or more graphics commands and two or more sequential frames to interframe module 220 and transmits the one or more graphics commands and an individual frame to interframe module 240. Interframe module 220 then performs the interframe encoding process while intraframe module 240 performs the intraframe encoding process. In one embodiment, plugin 204 performs the method 300 instead of third-party application 210.

Interframe Block Matching

Figure 4:
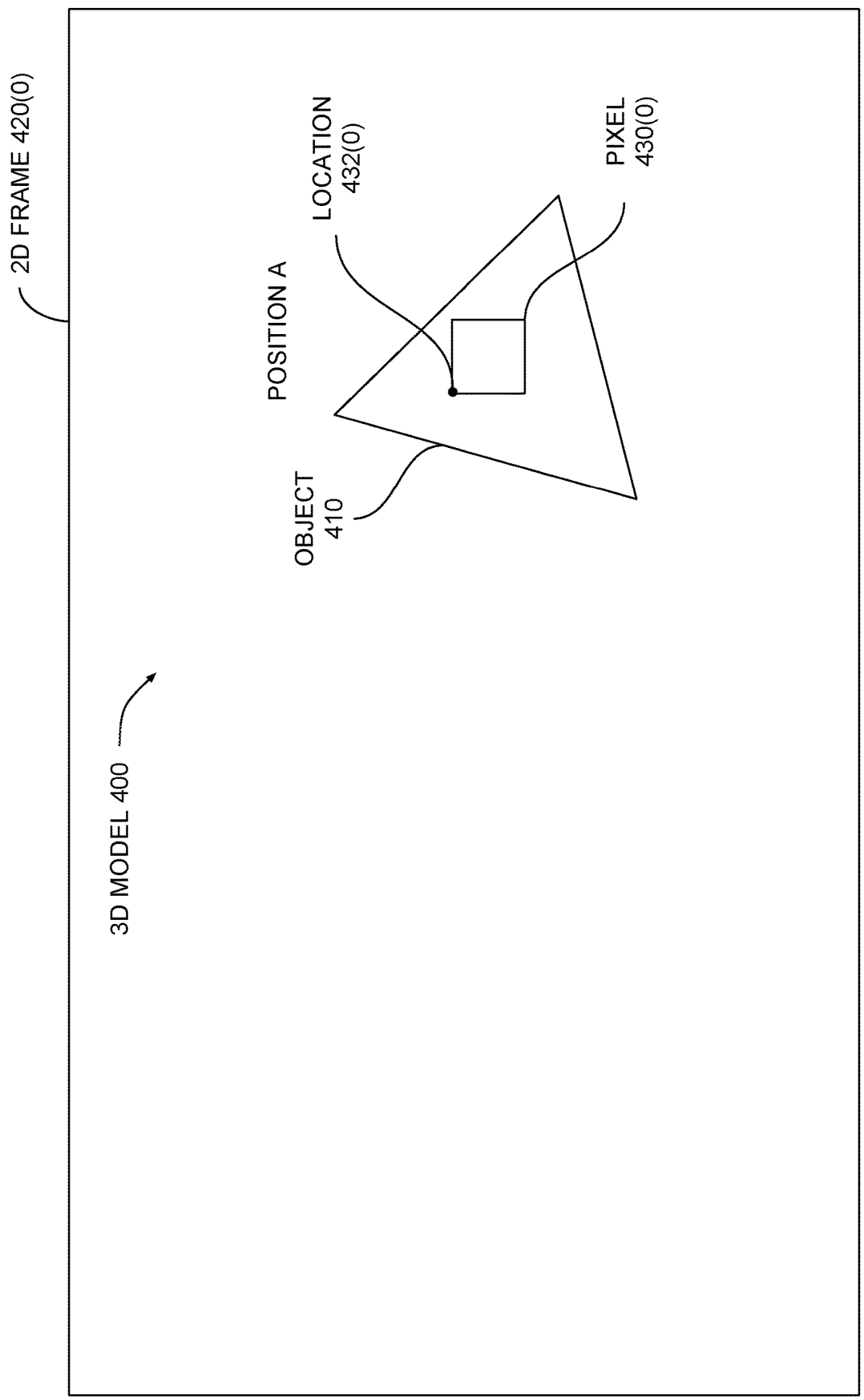
FIG. 4 illustrates an exemplary three-dimensional (3D) model that has been rendered to produce a two-dimensional (2D) frame, according to various embodiments of the present invention.

FIG. 4 illustrates an exemplary three-dimensional (3D) model that has been rendered to produce a two-dimensional (2D) frame, according to various embodiments of the present invention. As shown, a 3D model 400 includes an object 410 that resides at a position A. Graphics application 200 generates 3D model 400 and then transmits 3D model 400 to graphics processor 120 for rendering. Graphics processor 120 renders a 2D frame 420(0) that includes a set of pixels derived from 3D model 400, including pixel 430(0). Pixel 430(0) has a color value that is determined based on the color of object 410 and lighting conditions associated with a location 432(0) where pixel 430(0) resides. Location 432(0) corresponds to the upper-left corner of pixel 430(0), although any other coordinate system can also be used.

Graphics application 200 transmits a graphics command to graphics processor 120 indicating a transformation to apply to 3D model 400. This transformation causes object 410 to move to a different position. Interframe module 200 analyzes the graphics command to determine how the transformation affects pixel 420(0), as described in greater detail below in conjunction with FIG. 5.

Figure 5:
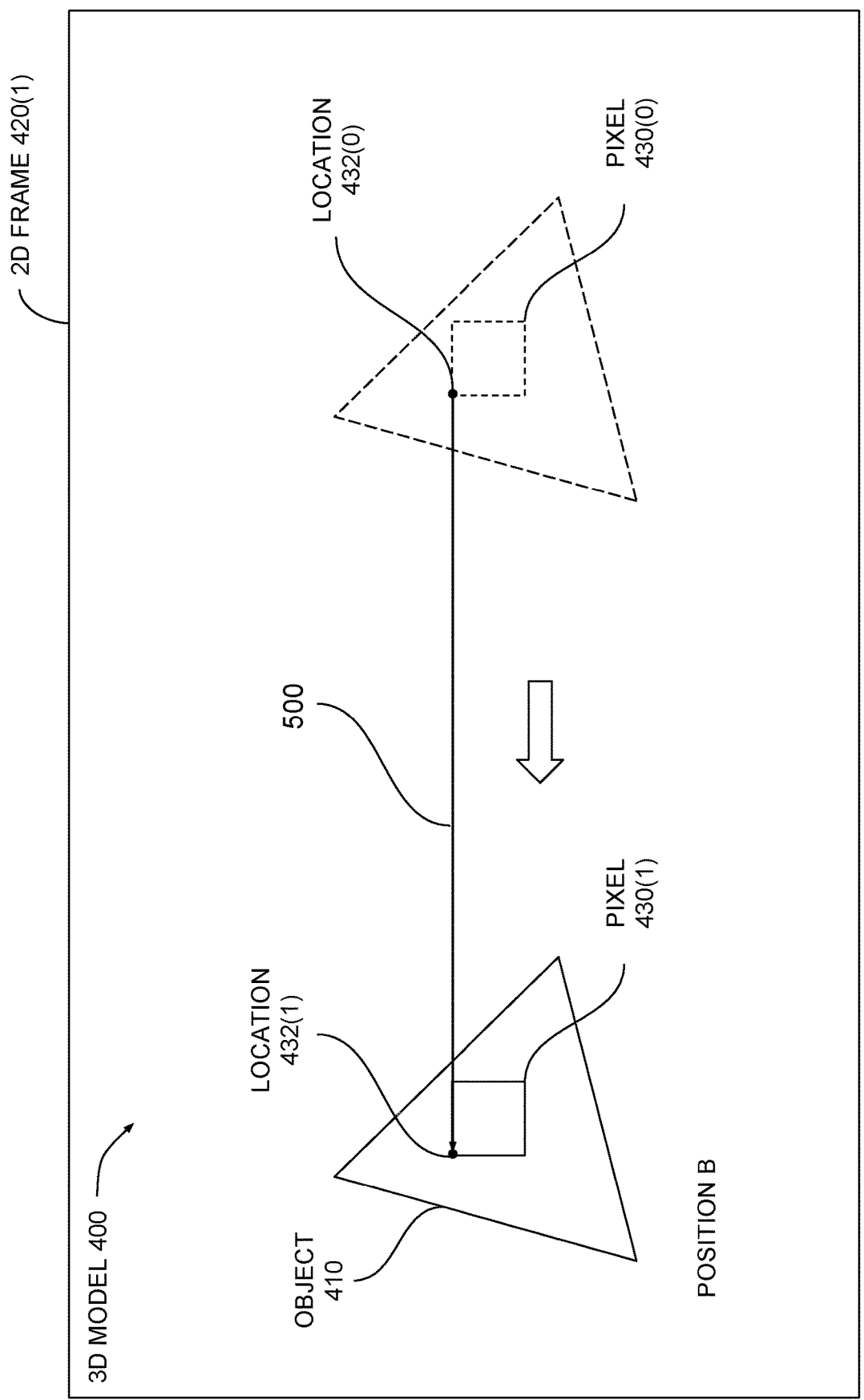
FIG. 5 illustrates how the interframe module of FIG. 2 tracks the movement of a pixel between sequential 2D frames, according to various embodiments of the present invention.

FIG. 5 illustrates how the interframe module of FIG. 2 tracks the movement of a pixel between sequential 2D frames, according to various embodiments of the present invention. As shown, via the transformation mentioned above, object 410 moves from position A to position B. Graphics processor 120 renders a 2D frame 420(1) that includes a set of pixels, including pixel 430(0). 2D frame 420(1) sequentially follows 2D frame 420(0) of FIG. 4. Pixel 430(1) has a color value that is determined based on the color of object 410 and lighting conditions associated with a location 432(1) where pixel 430(1) resides.

Because pixels 430(0) and 430(1) are both rendered based on the same portion of object 410, these two pixels typically have similar color values. The color values of pixels 430(0) and 430(1) may differ only slightly based on variations in lighting conditions between locations 432(0) and 432(1). Accordingly, pixel 430(1) can be considered a repeated version of pixel 430(0). Geometry analyzer 222 of FIG. 2 analyzes the graphics command and determines that the transformation applied to 3D model 400 should cause a repeated version of pixel 430(0) to appear at location 432(1). This type of determination may be referred to as a "coding prediction." Geometry analyzer 222 generates a vector 500 indicating where pixel 430(0) repeats in 2D frame 420(1).

Block generator 224 within interframe module 200 then generates a block of pixels and a corresponding vector based on pixels 430(0) and 430(1), as described in greater detail below in conjunction with FIG. 6.

Figure 6:
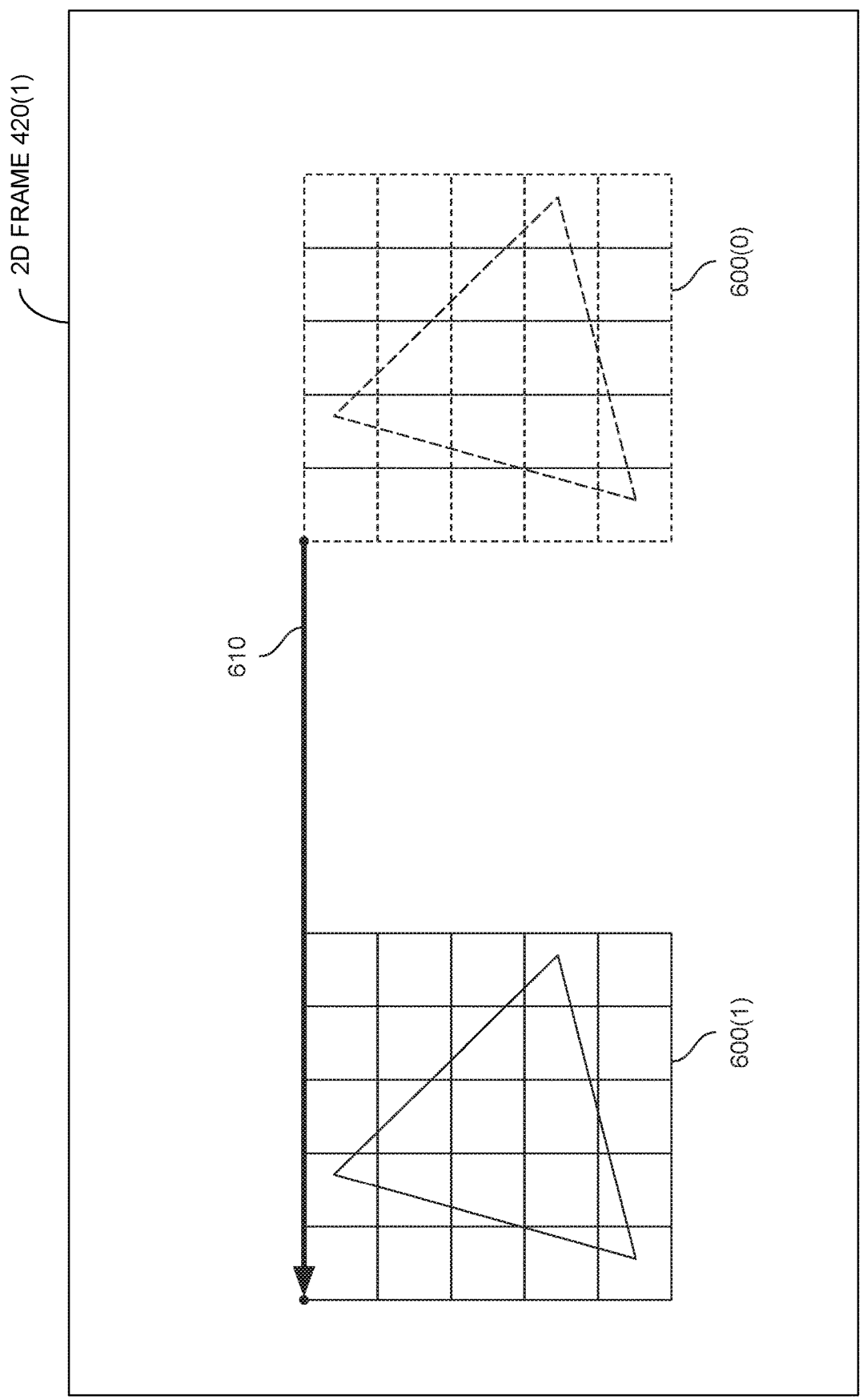
FIG. 6 illustrates how the interframe module of FIG. 2 tracks the movement of a block of pixels between sequential 2D frames, according to various embodiments of the present invention.

FIG. 6 illustrates how the interframe module of FIG. 2 tracks the movement of a block of pixels across sequential 2D frames, according to various embodiments of the present invention. As shown, block generator 224 generates a block of pixels 600(0) based on pixel 430(0) and generates a block of pixels 600(1) based on pixel 430(1). Block of pixels 600(0) may appear similar to block of pixels 600(1) because both blocks of pixels are rendered based on object 410. Accordingly, block of pixels 600(1) can be considered a repeated version of block of pixels 600(0). Block generator 224 generates a vector 610 indicating how block of pixels 600(0) moves between 2D frames 420(0) and 420(1).

Block generator 224 can implement any technically approach for grouping pixels together to generate blocks of pixels 600(0) and/or 600(1). For example, block generator 224 could generate a neighborhood of adjacent pixels surrounding pixel 430(0) and compare this neighborhood of pixels to a corresponding neighborhood surrounding pixel 430(1). Block generator 224 could expand these neighborhoods until the overall difference in color values between corresponding pixels in each neighborhood exceeds a threshold error value.

Block generator 224 transmits information indicating block of pixels 600(0) and 600(1) and vector 610 to codec 250. Codec 250 can encode 2D frames 420(0) and 420(1) into compressed form based on this information. In particular, block of pixels 600(0) need only be stored one time for both of 2D frames 420(0) and 420(1) because vector 610 indicates how that block of pixels moves across the two frames. Although block of pixels 600(1) may have slightly different pixel values due to variations in lighting conditions, codec 250 tracks these residual color differences during compression. Advantageously, via the above process, interframe module 220 is capable of identifying repeated blocks of pixels without performing the numerous comparisons implemented by conventional approaches. This process is described in stepwise fashion below in conjunction with FIG. 7.

Figure 7:
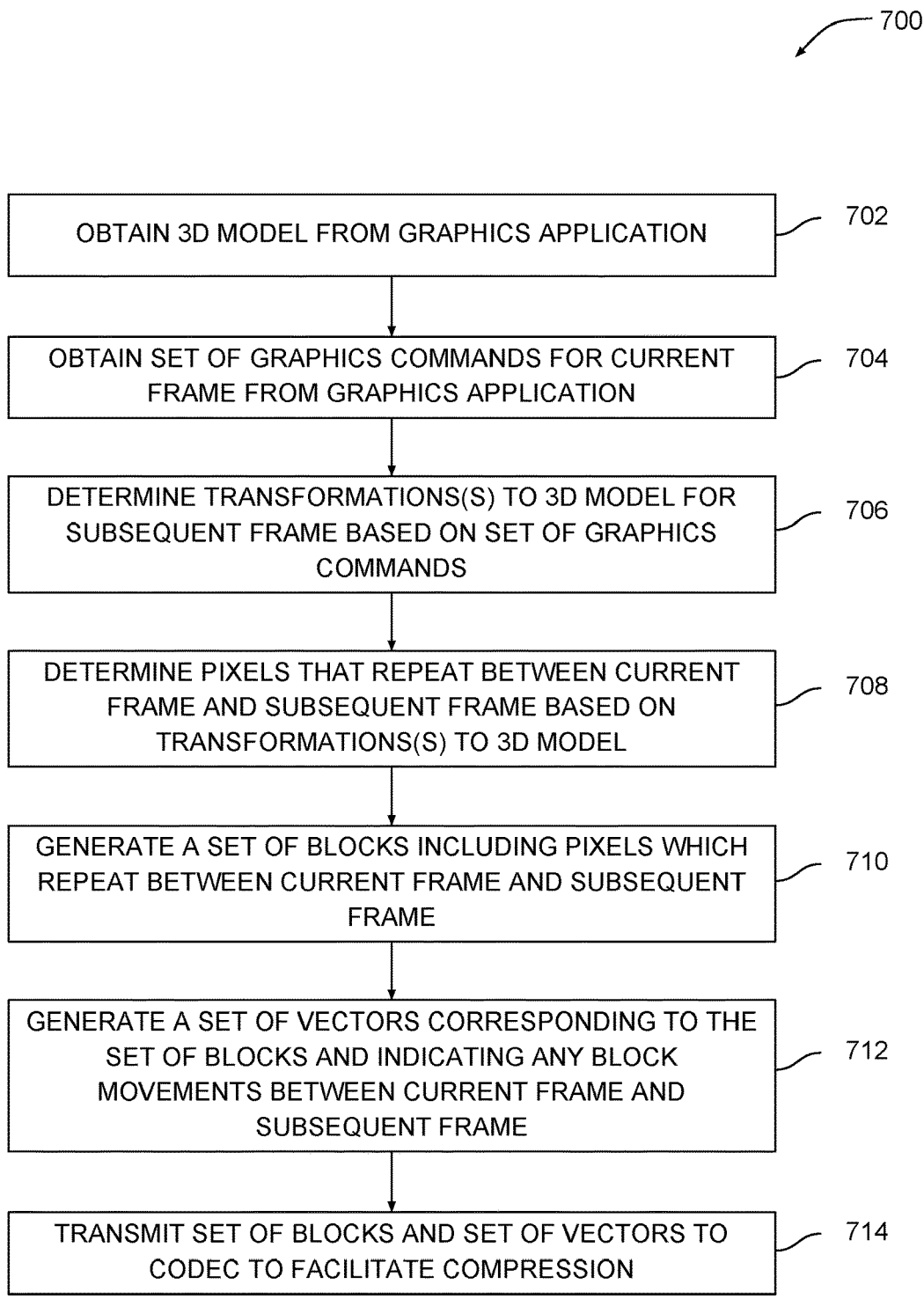
FIG. 7 is a flow diagram of method steps for encoding 2D frames of video data using interframe block matching, according to various embodiments of the present invention.

FIG. 7 is a flow diagram of method steps for compressing frames of video data using interframe block matching, according to various embodiments of the present invention. Although the method steps are described in conjunction with the systems of FIGS. 1-6, persons skilled in the art will understand that any system configured to perform the method steps in any order falls within the scope of the present invention.

As shown, a method 700 begins at step 702, where interframe module 200 obtains a 3D model from graphics application 200. The 3D model could represent a graphics scene, for example, such as a scene in a video game. The 3D model could also include one or more characters. Generally, the 3D model includes a collection of vertices which define polygons. At step 704, interframe module 220 obtains a set of graphics commands for a current frame from graphics application 200. The set of graphics commands indicates transformations to be applied to the 3D model between rendered frames. For example, a given graphics command could indicate that a particular set of polygons associated with the 3D model should rotate. At step 706, interframe module 220 determines these transformations(s) to the 3D model for a subsequent frame based on the set of graphics commands.

At step 708, interframe module 220 determines pixels that repeat between the current frame and the subsequent frame based on the transformations(s) to the 3D model. As a general matter, a pixel "repeats" across two frames when both frames include a pixel that is rendered based on the same or similar portion of the 3D model. Each frame may include a slightly different version of the pixel due to variations in lighting conditions, perspective, and so forth. At step 710, interframe module 220 generates a set of blocks including pixels which repeat between the current frame and the subsequent frame. Interframe module 220 can generate blocks using any technically feasible approach to grouping pixels together. In one embodiment, interframe module 220 may expand a neighborhood of pixels around a repeated pixel while minimizing an error metric, as described above in conjunction with FIG. 6.

At step 712, interframe module 220 generates a set of vectors corresponding to the set of blocks and indicating any block movements between the current frame and the subsequent frame. In some cases, a given block may not move between frames. The vector associated with such a block would indicate that the block does not change locations. At step 714, interframe module 220 transmits the set of blocks and corresponding set of vectors to codec 250 to facilitate compression. Codec 250 can generate compressed video data 146 which consumes less space compared to uncompressed video data 144 by eliminating redundancies associated with repeated blocks of pixels.

As discussed above in conjunction with FIG. 2, intraframe module 240 provides an additional compression pathway that can be used in addition to intraframe encoding. An example of how intraframe module 240 operates is provided below in conjunction with FIGS. 8-10.

Intraframe Block Matching

Figure 8:
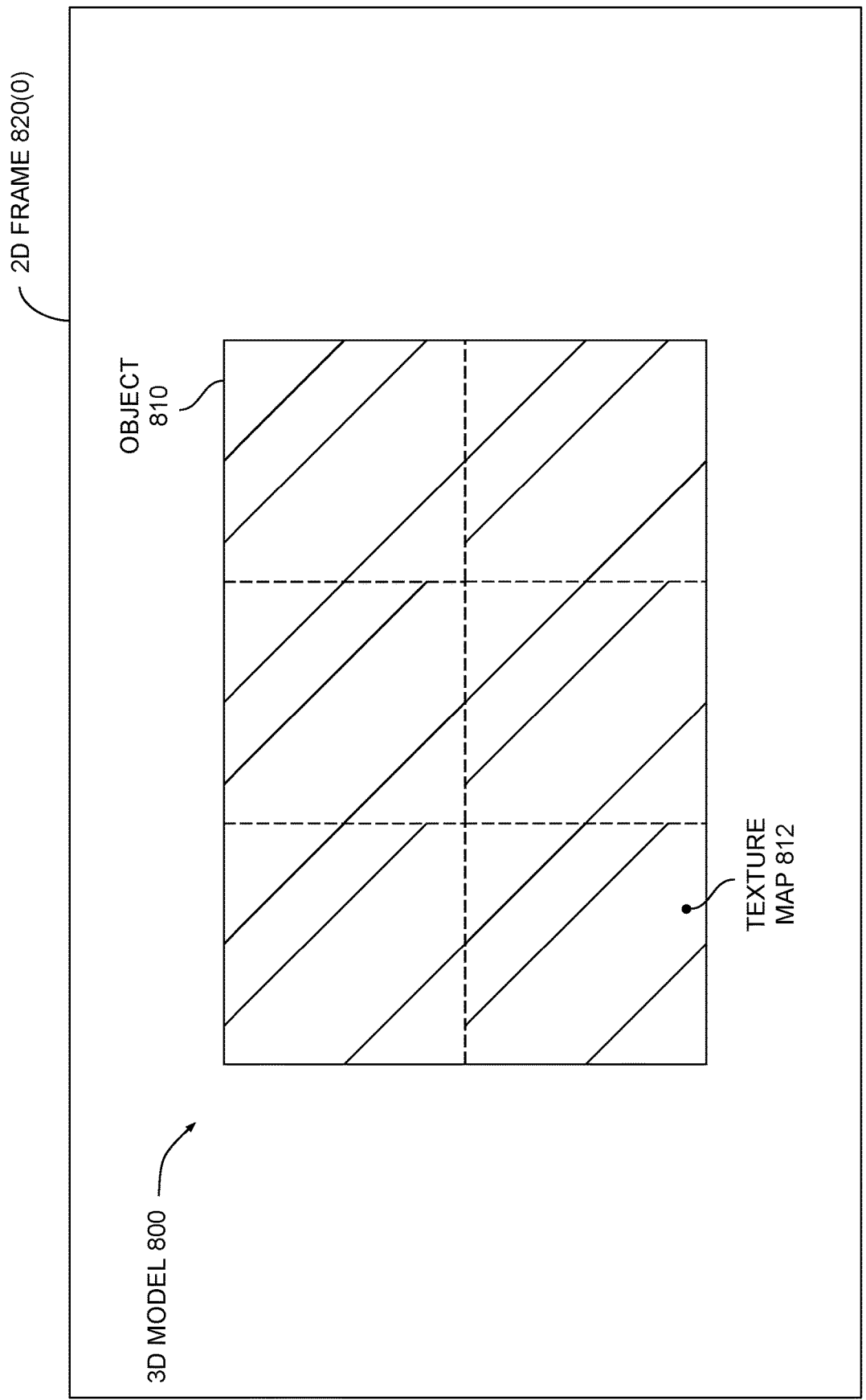
FIG. 8 illustrates an exemplary 3D object that is textured using a texture map, according to various embodiments of the present invention.

FIG. 8 illustrates an exemplary 3D object that is textured using a 2D texture map, according to various embodiments of the present invention. As shown, a 3D model 800 includes an object 810 across which a texture map 812 is repeated six times. Graphics application 200 transmits 3D model 800 to graphics processor 120 along with texture map 812. Graphics application 200 also transmits a graphics command indicating that texture map 812 should be repeated across the surface of object 810. Based on this information, graphics processor 120 can render a set of pixels included in a 2D frame 820(0), as is shown.

In conjunction with this rendering, intraframe module 240 also causes graphics processor 120 to perform an intermediate render of object 810. The intermediate render can be used to determine pixel locations where portions of texture map 812 repeat within 2D frame 820(0), as described in greater detail below in conjunction with FIG. 9.

Figure 9:
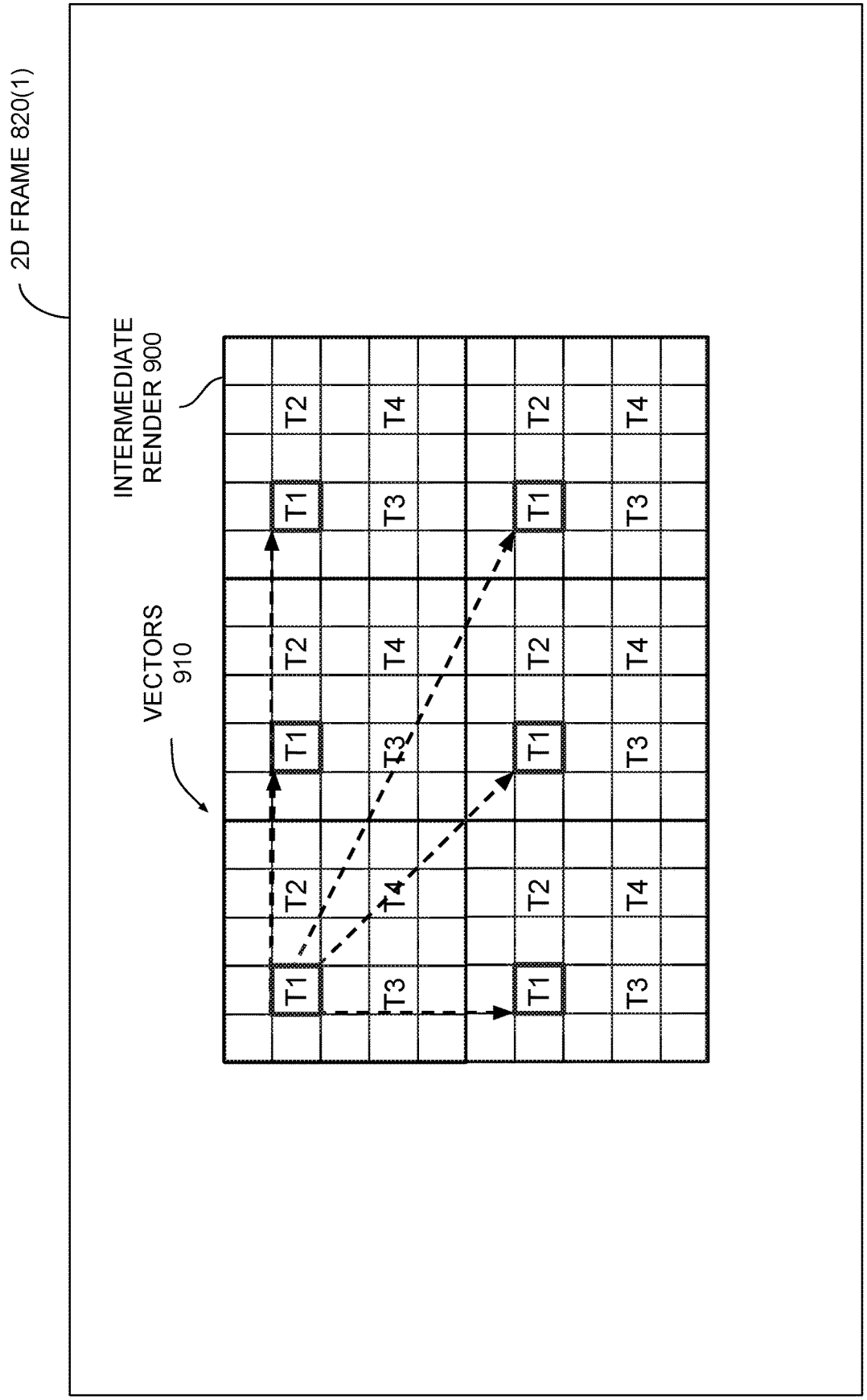
FIG. 9 illustrates how the intraframe module of FIG. 2 renders texture coordinates to a 2D frame, according to various embodiments of the present invention.

FIG. 9 illustrates how the intraframe module of FIG. 2 renders texture coordinates to a 2D frame, according to various embodiments. As shown, a 2D frame 820(1) includes an intermediate render of object 810. Intermediate render 900 includes a set of pixels that represent the repeated texture shown in FIG. 8. However, instead of pixel color values, texture coordinates are rendered to each pixel where texture 812 is mapped. Four exemplary texture coordinates T1, T2, T3, and T4 are shown. The texture coordinate associated with a given pixel corresponds to a location within texture map 812 that is used to provide a color value for the given pixel. Because texture map 812 repeats across the surface of object 810 within intermediate render 900, texture coordinates T1, T2, T3, and T4 similarly repeat.

Texture analyzer 242 within intraframe module 240 analyzes intermediate render 900 and identifies repeated texture coordinates. These repeated texture coordinates indicate locations where pixels repeat within 2D frame 820(0). Texture analyzer 242 can identify repeated texture coordinates more efficiently than identifying repeated pixels because comparisons between texture coordinates can be performed more efficiently than comparisons between pixel color values. Accordingly, the approach described herein is more efficient and therefore faster than conventional approaches.

Texture analyzer 242 also generates vectors 910 indicating locations within intermediate render 900 where each texture coordinate repeats. Block generator 244 processes the identified pixels and corresponding vectors and then generates blocks of pixels, as described in greater detail below in conjunction with FIG. 10.

Figure 10:
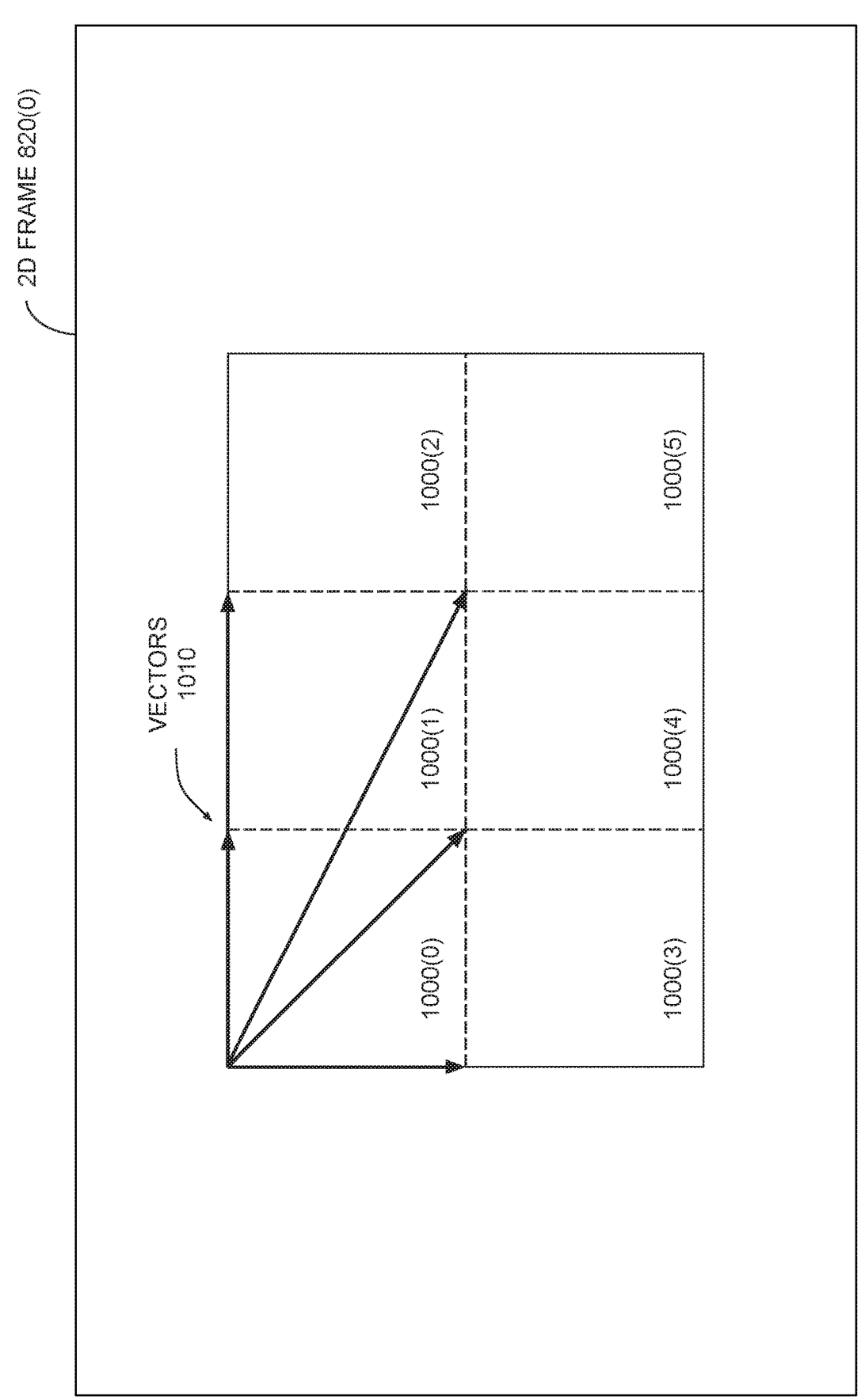
FIG. 10 illustrates how the intraframe module of FIG. 2 tracks the replication of a block of pixels within an individual 2D frame, according to various embodiments of the present invention.

FIG. 10 illustrates how the intraframe module of FIG. 2 tracks the replication of a block of pixels within an individual 2D frame, according to various embodiments. As shown, block generator 244 generates blocks of pixels 1000 and corresponding vectors 1010. Block generator 244 may perform a similar block generation approach as block generator 224 discussed above in conjunction with FIGS. 2 and 6. In particular, in one embodiment, block generator 244 expands neighborhoods around matched pixels and compares expanded neighborhoods to one another. Block generator 244 may continue this process until an overall error threshold is exceeded.

Block generator transmits information indicating blocks 1000 and corresponding vectors 1010 to codec 250 to facilitate intraframe encoding. Codec 250 can encode 2D frame 820(0) into compressed form based on this information. More specifically, only one block of pixels 1000 needs to be stored instead of all six, because vector 910 indicates where that one block of pixels repeats within 2D frame 820(0). Advantageously, via the above process, intraframe module 240 is capable of identifying repeating blocks of pixels without performing the numerous comparisons implemented by conventional approaches. Intraframe module 240 can therefore facilitate rapid encoding of video data into compressed form. This process is described in stepwise fashion below in conjunction with FIG. 11.

Figure 11:
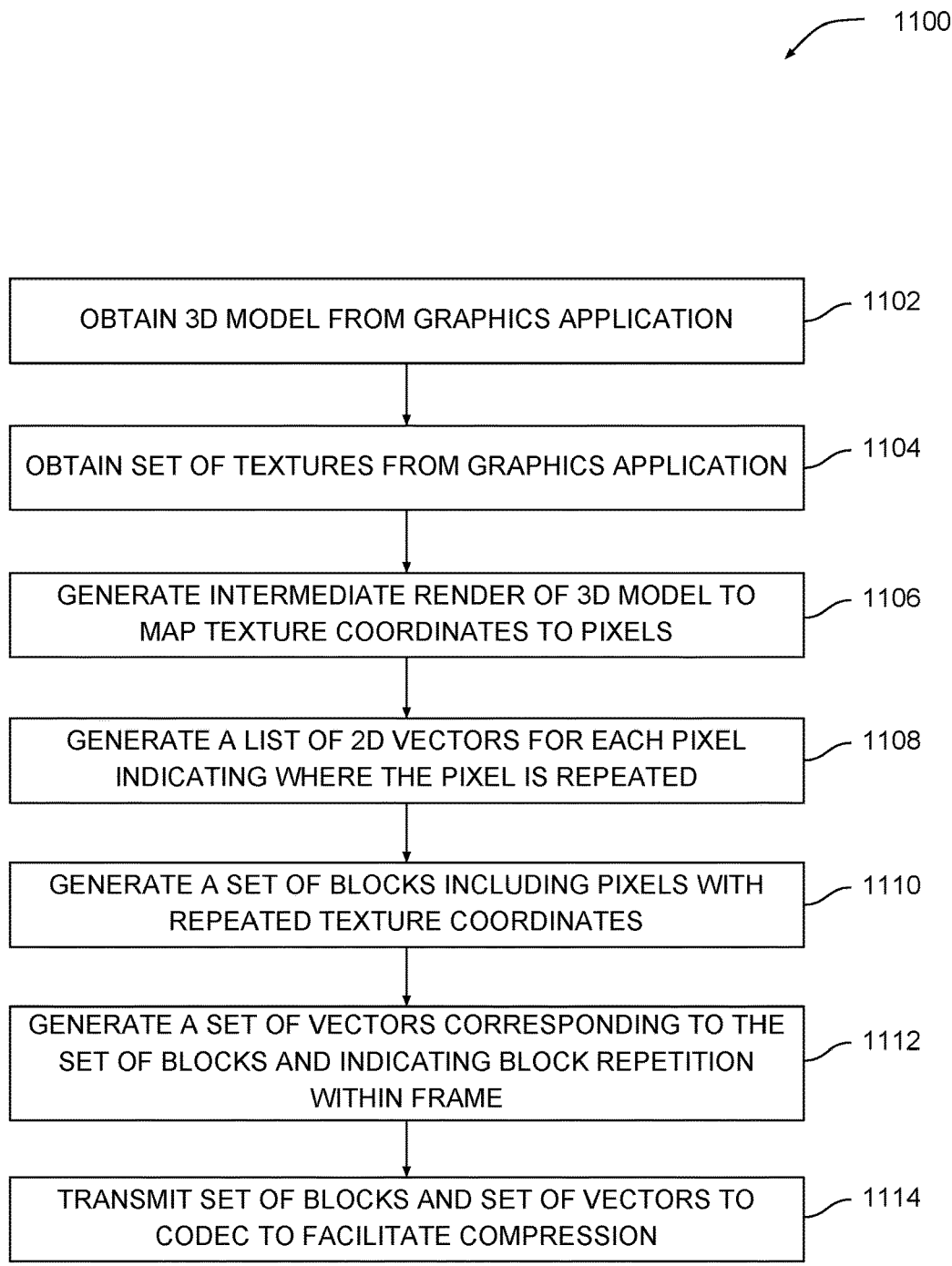
FIG. 11 is a flow diagram of method steps for compressing 2D frames of video data using intraframe block matching, according to various embodiments of the present invention.

FIG. 11 is a flow diagram of method steps for compressing frames of video data using intraframe block matching, according to various embodiments. Although the method steps are described in conjunction with the systems of FIGS. 1-3 and 8-10, persons skilled in the art will understand that any system configured to perform the method steps in any order falls within the scope of the present invention.

As shown, a method 1100 begins at step 1102, where intraframe module 240 obtains a 3D model from graphics application. Intraframe module 240 may interface with third-party application 210 or, in some embodiments, plugin 204 to obtain the 3D model. The 3D model may include a triangulated mesh of polygons defining a collection of surfaces. At step 1104, intraframe module 240 obtains a set of textures from graphics application 200. The textures are defined via texture maps. A given texture map indicates specific pixel color values for different coordinates within the texture map.

At step 1106, intraframe module 240 generates an intermediate render of the 3D model by mapping texture coordinates to pixels. Intraframe module 240 can then identify repeated pixels based on this intermediate render. Intraframe module 240 may interface within graphics processor 120 to perform step 1106. Under normal circumstances, color values would be rendered to pixels. However, identifying repeated pixels within an individual frame based on color values can be computationally less efficient than doing so based on texture coordinates. At step 1108, intraframe module 240 generates a list of 2D vectors for each pixel indicating where the pixel is repeated. These vectors could be, for example, vectors 910 shown in FIG. 9.

At step 1110, intraframe module 240 generate a set of blocks that include pixels with repeated texture coordinates. Intraframe module 240 can implement any technically feasible approach for grouping together pixels to perform step 1110. The generated blocks of pixels can have any size and any dimensions. At step 1112, intraframe module 240 generates a set of vectors corresponding to the set of blocks and indicating block repetition within the frame. Because a given vector is smaller in size that an entire block of pixels, specifying a location where a block repeats using a vector eliminates the need to store multiple copies of the block of pixels. At step 1114, intraframe module 240 transmits the set of blocks and set of vectors to codec 250 to facilitate compression.

In sum, a set of software applications configured to perform interframe and/or intraframe encoding operations based on data communicated between a graphics application and a graphics processor. The graphics application transmits a 3D model to the graphics processor to be rendered into a 2D frame of video data. The graphics application also transmits graphics commands to the graphics processor indicating specific transformations to be applied to the 3D model as well as textures that should be mapped onto portions of the 3D model. Based on these transformations, an interframe module can determine blocks of pixels that repeat across sequential frames. Based on the mapped textures, an intraframe module can determine blocks of pixels that repeat within an individual frame. A codec encodes the frames of video data into compressed form based on blocks of pixels that repeat across frames or within frames.

One advantage of the disclosed techniques is that frames of video data can quickly be encoded into a compressed form without performing a vast number of comparison operations. Accordingly, compressed video data can be generated much faster than conventional techniques. In addition, the disclosed techniques do not rely on any dedicated compression circuitry, and therefore can be used in conjunction with pre-existing graphics hardware.

Importantly, because the disclosed techniques leverage information captured from the graphics processor when generating the video data, these techniques are especially well-suited to graphics applications such as video games. For example, the disclosed techniques could improve the speed and efficiency with which a video game is live-streamed across a network. Accordingly, the disclosed techniques represent multiple technological advancements over prior art approaches.

1. Some embodiments include a computer-implemented method for encoding video data, the method comprising obtaining a first command that has been transmitted to a processor, identifying a first pixel that resides in a first video frame, identifying a second pixel that resides in either the first video frame or a second video frame based on the first graphics command and the first pixel, generating a first vector based on a first location associated with the first pixel and a second location associated with the second pixel, and generating encoded video data based on the first pixel, the second pixel, and the first vector.

2. The computer-implemented method of clause 1, wherein generating the encoded video data comprises determining a first block of pixels that resides in the first video frame based on the first pixel, determining a second block of pixels that resides in either the first video frame or the second video frame based on the second pixel, and generating a second vector based on a third location associated with the first block of pixels and a fourth location associated with the second block of pixels, wherein the encoded video data includes the first block of pixels and the second vector.

3. The computer-implemented method of any of clauses 1-2, further comprising obtaining a three-dimensional (3D) model that has been transmitted to the processor.

4. The computer-implemented method of any of clauses 1-3, wherein the first command indicates a first transformation that is to be applied to the 3D model prior to when the second video frame is rendered.

5. The computer-implemented method of any of clauses 1-4, wherein the first transformation, when applied to the 3D model, causes at least a portion of the 3D model to move from a first position that is associated with the first location to a second position that is associated with the second location.

6. The computer-implemented method of any of clauses 1-5, wherein the first command indicates a first texture that is to be mapped to the 3D model prior to when the first video frame is rendered.

7. The computer-implemented method of any of clauses 1-6, further comprising rendering a first texture coordinate to the first pixel based on the first texture, and rendering the first texture coordinate to the second pixel, wherein the second pixel is identified based on the first texture coordinate and the second texture coordinate.

8. The computer-implemented method of any of clauses 1-7, wherein both the first pixel and the second pixel are rendered based on a first portion of the 3D model.

9. The computer-implemented method of any of clauses 1-8, further comprising deriving a difference in color values between the first pixel and the second pixel based on a difference in lighting conditions between the first location and the second location.

10. The computer-implemented method of any of clauses 1-9, wherein the encoded video data indicates the difference in color values.

11. Some embodiments include a non-transitory computer-readable medium storing program instructions that, when executed by a processor, cause the processor to encode video data by performing the steps of obtaining a first command that has been transmitted to a processor, identifying a first pixel that resides in a first video frame, identifying a second pixel that resides in either the first video frame or a second video frame based on the first graphics command and the first pixel, generating a first vector based on a first location associated with the first pixel and a second location associated with the second pixel, and generating encoded video data based on the first pixel, the second pixel, and the first vector.

12. The non-transitory computer-readable medium of clause 11, wherein the step of generating the encoded video data comprises determining a first block of pixels that resides in the first video frame based on the first pixel, determining a second block of pixels that resides in either the first video frame or the second video frame based on the second pixel, and generating a second vector based on a third location associated with the first block of pixels and a fourth location associated with the second block of pixels, wherein the encoded video data includes the first block of pixels and the second vector.

13. The non-transitory computer-readable medium of any of clauses 11-12, further comprising the step of obtaining a set of polygons that has been transmitted to the processor, wherein the set of polygons represents a three-dimensional object in a graphics scene.

14. The non-transitory computer-readable medium of any of clauses 11-13, wherein the first command indicates a first transformation that is to be applied to the set of polygons prior to when the second video frame is rendered.

15. The non-transitory computer-readable medium of any of clauses 11-14, wherein the first transformation, when applied to the set of polygons, causes the set of polygons move from a first position that is associated with the first location to a second position that is associated with the second location.

16. The non-transitory computer-readable medium of any of clauses 11-15, wherein the first command indicates a first texture that is to be mapped to the set of polygons prior to when the first video frame is rendered.

17. The non-transitory computer-readable medium of any of clauses 11-16, further comprising the steps of rendering a first texture coordinate to the first pixel based on the first texture, and rendering the first texture coordinate to the second pixel, wherein the second pixel is identified based on the first texture coordinate and the second texture coordinate.

18. The non-transitory computer-readable medium of any of clauses 11-17, wherein both the first pixel and the second pixel are rendered based on the set of polygons.

19. The non-transitory computer-readable medium of any of clauses 11-18, further comprising the step of deriving a difference in color values between the first pixel and the second pixel based on a difference in lighting conditions between the first location and the second location, wherein the encoded video data indicates the difference in color values.

20. Some embodiments include a system, comprising a memory storing one or more software applications, and a processor that, when executing the one or more software applications, is configured to perform the steps of obtaining a first command that has been transmitted to a processor, identifying a first pixel that resides in a first video frame, identifying a second pixel that resides in either the first video frame or a second video frame based on the first graphics command and the first pixel, generating a first vector based on a first location associated with the first pixel and a second location associated with the second pixel, and generating encoded video data based on the first pixel, the second pixel, and the first vector.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for encoding video data, the method comprising:
   obtaining a first command that has been transmitted to a processor, wherein the first command indicates a first transformation that is to be applied to
      a three-dimensional (3D) model prior to when a second video frame is rendered, or
      a first texture that is to be mapped to the 3D model prior to when a first video frame is rendered;
   identifying a first pixel that resides in the first video frame;
   identifying a second pixel that resides in either the first video frame or the second video frame based on the first pixel and either the first transformation or the first texture;
   generating a first vector based on a first location associated with the first pixel and a second location associated with the second pixel; and
   generating encoded video data based on the first pixel, the second pixel, and the first vector.

2. The computer-implemented method of claim 1, wherein generating the encoded video data comprises:
   determining a first block of pixels that resides in the first video frame based on the first pixel;
   determining a second block of pixels that resides in either the first video frame or the second video frame based on the second pixel; and
   generating a second vector based on a third location associated with the first block of pixels and a fourth location associated with the second block of pixels, wherein the encoded video data includes the first block of pixels and the second vector.

3. The computer-implemented method of claim 1, wherein the first transformation, when applied to the 3D model, causes at least a portion of the 3D model to move from a first position that is associated with the first location to a second position that is associated with the second location.

4. The computer-implemented method of claim 1, wherein the first command indicates the first transformation that is to be applied to the first texture, and further comprising:
   rendering a first texture coordinate to the first pixel based on the first texture; and
   rendering the first texture coordinate to the second pixel, wherein the second pixel is identified based on the first texture coordinate and a second texture coordinate.

5. The computer-implemented method of claim 1, wherein both the first pixel and the second pixel are rendered based on a first portion of the 3D model.

6. The computer-implemented method of claim 1, further comprising deriving a difference in color values between the first pixel and the second pixel based on a difference in lighting conditions between the first location and the second location.

7. The computer-implemented method of claim 6, wherein the encoded video data indicates the difference in color values.

8. A non-transitory computer-readable medium storing program instructions that, when executed by a processor, cause the processor to encode video data by performing the steps of:
   obtaining a first command that has been transmitted to a processor, wherein the first command indicates a first transformation that is to be applied to
      a set of polygons prior to when a second video frame is rendered, or
      a first texture that is to be mapped to the set of polygons prior to when a first video frame is rendered;
   identifying a first pixel that resides in the first video frame,
   identifying a second pixel that resides in either the first video frame or the second video frame based on the first pixel and either the first transformation or the first texture;
   generating a first vector based on a first location associated with the first pixel and a second location associated with the second pixel; and
   generating encoded video data based on the first pixel, the second pixel, and the first vector.

9. The non-transitory computer-readable medium of claim 8, wherein the step of generating the encoded video data comprises:
   determining a first block of pixels that resides in the first video frame based on the first pixel;
   determining a second block of pixels that resides in either the first video frame or the second video frame based on the second pixel; and
   generating a second vector based on a third location associated with the first block of pixels and a fourth location associated with the second block of pixels, wherein the encoded video data includes the first block of pixels and the second vector.

10. The non-transitory computer-readable medium of claim 8, wherein the set of polygons represents a three-dimensional object in a graphics scene.

11. The non-transitory computer-readable medium of claim 8 wherein the first transformation, when applied to the set of polygons, causes the set of polygons to move from a first position that is associated with the first location to a second position that is associated with the second location.

12. The non-transitory computer-readable medium of claim 8, wherein the first command indicates the first transformation that is to be applied to the first texture, and further comprising the steps of:
   rendering a first texture coordinate to the first pixel based on the first texture; and
   rendering the first texture coordinate to the second pixel, wherein the second pixel is identified based on the first texture coordinate and a second texture coordinate.

13. The non-transitory computer-readable medium of claim 8, wherein both the first pixel and the second pixel are rendered based on the set of polygons.

14. The non-transitory computer-readable medium of claim 8, further comprising the step of deriving a difference in color values between the first pixel and the second pixel based on a difference in lighting conditions between the first location and the second location, wherein the encoded video data indicates the difference in color values.

15. A system, comprising:
   a memory storing one or more software applications; and
   a processor that, when executing the one or more software applications, is configured to perform the steps of:
      obtaining a first command that has been transmitted to a processor,
         wherein the first command indicates a first transformation that is to be applied to
            a three-dimensional (3D) model prior to when a second video frame is rendered, or a first texture that is to be mapped to the 3D model prior to when a first video frame is rendered, identifying a first pixel that resides in the first video frame, identifying a second pixel that resides in either the first video frame or the second video frame based on the first pixel and either the first transformation or the first texture, generating a first vector based on a first location associated with the first pixel and a second location associated with the second pixel, and generating encoded video data based on the first pixel, the second pixel, and the first vector.

\* \* \* \* \*